United States Patent [19]

Cummins

[11] Patent Number: 4,947,558

[45] Date of Patent: Aug. 14, 1990

[54] HAND HELD MEASURING DEVICE

[76] Inventor: William G. Cummins, 40 West, 781 Norris Rd., Aurora, Ill. 60506

[21] Appl. No.: 388,970

[22] Filed: Aug. 2, 1989

[51] Int. Cl.$^5$ .......................... G01B 3/16; G01B 3/40
[52] U.S. Cl. .................................. 33/797; 33/558.01; 33/801
[58] Field of Search .................. 33/797, 798, 800, 801, 33/807, 558.01, 558.02, 558.03, 558.04, 558.05, 558.4

[56] References Cited

U.S. PATENT DOCUMENTS

| | | | |
|---|---|---|---|
| 45,529 | 12/1864 | Smith | 33/801 |
| 267,481 | 11/1882 | Bellamy | 33/558.01 |
| 476,057 | 5/1892 | Niller | |
| 611,971 | 10/1898 | Lutz | |
| 713,096 | 11/1902 | Hess | 33/801 |
| 1,285,175 | 11/1918 | Hinkle | 33/798 |
| 1,648,643 | 11/1927 | Hart et al. | 33/798 |
| 1,827,093 | 10/1931 | McCabe | 33/800 |
| 2,362,907 | 11/1944 | Levin | 33/178 |
| 3,822,476 | 7/1974 | Leveridge | 33/143 |
| 4,635,370 | 1/1987 | Beaver | 33/558.01 |
| 4,745,685 | 5/1988 | Castillo | 33/199 |

Primary Examiner—William A. Cuchlinski, Jr.
Assistant Examiner—Alvin Wirthlin
Attorney, Agent, or Firm—Allegretti & Witcoff, Ltd.

[57] ABSTRACT

A hand held measuring device for measuring the size of small objects such as nuts, bolts, and the like. The device includes both an English measuring scale and a Metric measuring scale and may be used to gauge the size of either a Metric or an English standard bolt.

The device employs two pivotally attached plate-like elements, each plate-like element having a pincer element. Each pincer element has a contact point. The contact points of each pincer element cooperate to define the reference points for measurement. Further, the device includes a Metric and an English graduated scale and an indicating mechanism associated with each graduated scale.

An object is measured by adjusting the distance between the contact points until the distance mirrors the overall dimension of the object. The graduated scale and corresponding indicating mechanism cooperate with the contact points to define the dimension of the object.

4 Claims, 2 Drawing Sheets 4,947,558

HAND HELD MEASURING DEVICE

BACKGROUND OF THE INVENTION

The present invention relates to a pivotal type hand held measuring device.

Early prior patents disclose the use of a system of pivotally related plate-like elements for measuring devices. For example, U.S. Pat. No. 476,057 discloses a measuring device employing a pivotal arm attached to a generally cam-shaped metal gauge plate, wherein the arm rotates relative to the size of an object to be measured. The diameter of the object is thereby indicated by the scale associated with the fixed camshaped plate. U.S. Pat. No. 611,971 discloses a system of complex components essentially comprising a fixed plate-like element and a rotating pointing element. The pointing element of the device is operatively associated with the scale of the fixed plate-like element. Yet another patent, U.S. Pat. No. 2,362,907, discloses a system of pivotally related complex components. The device calculates the diameter of an object by measuring its arc of curvature.

It is the object of the present invention to produce a measuring device that uses relatively simple component parts which are easy and inexpensive to manufacture. The device of the present invention comprises two similarly configured elements of relatively simple configuration.

Yet another object of the present invention is to provide a device that is durable and that does not require any intricate or elaborate component parts that would tend to detract from the device's durability. The device disclosed herein does not include any delicate or intricate component parts. Further, the device of the present invention is constructed such that the measuring scales are protected from abuse and wear.

Still another object of the present invention is to provide a device that incorporates both a Metric measuring scale and an English measuring scale. Such a device may be used to gauge the size of either an English or a Metric standard bolt.

Other objects and advantages of the present invention will be made more apparent hereinafter.

SUMMARY OF THE INVENTION

The device of the present invention is capable of measuring the size of an object, and in particular a nut or a bolt, in either English or Metric measuring units. The measuring device essentially comprises two component elements which are pivotally attached to one another.

Associated with each component element of the device is a pincer element. Each pincer element has a contact point. The contact points of each pincer element cooperate to define reference points for measurement. The device comprises at least one graduated scale operatively associated with the contact points and a means for indicating a selected graduation associated therewith.

The dimension of an object is measured by rotating the component elements so as to either increase or decrease the relative distance between the contact points. The component elements are rotated until the contact points of each are aligned with the outer edges of the object. The dimension of the object is thereby reflected by the indicating means associated with the graduated scale.

The device is adapted for both English and Metric measurements by including at least two graduated scales such that each component element has associated with it a graduated scale and a corresponding means for indicating a selected graduation.

BRIEF DESCRIPTION OF THE DRAWING

There is shown in the attached drawing a presently preferred embodiment of the invention wherein.

DETAILED DESCRIPTION OF THE PREFERRED EMBODIMENT

The measuring device of the present invention can be described with reference to FIGS. 1 through 5. Like numbers designate like parts in the respective figures.

Figure 1:
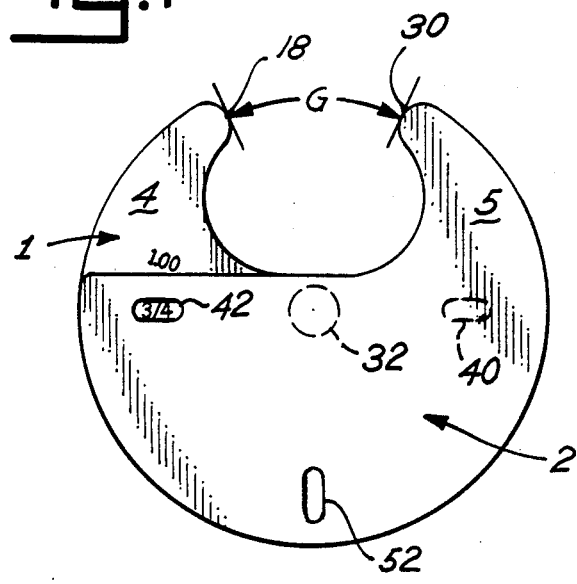
FIG. 1 is a plan view of the hand held measuring device embodying the present invention.

Referring now to FIG. 1, the device of the present invention comprises first and second component elements 1 and 2 which are pivotally attached to one another. Component elements 1 and 2 are constructed of a metallic material, such as brass, or a rigid plastic material. Briefly, the component elements 1 and 2 each include a pincer element 4 and 5, respectively. The device is constructed such that pincer element 4 opposes pincer element 5 and a gap G is created between pincer elements 4 and 5. The size of gap G may be adjusted by rotating the pivotally attached component elements 1 and 2. An object is measured by sizing the gap G so as to correspond to the dimension of the object e.g., the outer diameter of a bolt. Graduated scales 8 and 44 (FIG. 2) on component element 1 and graduated scales 10 and, 48 (FIG. 4) on component element 2 are operatively associated with the relative dimension between said pincer elements 4 and 5 and indicate the size of the gap G.

Figure 2:
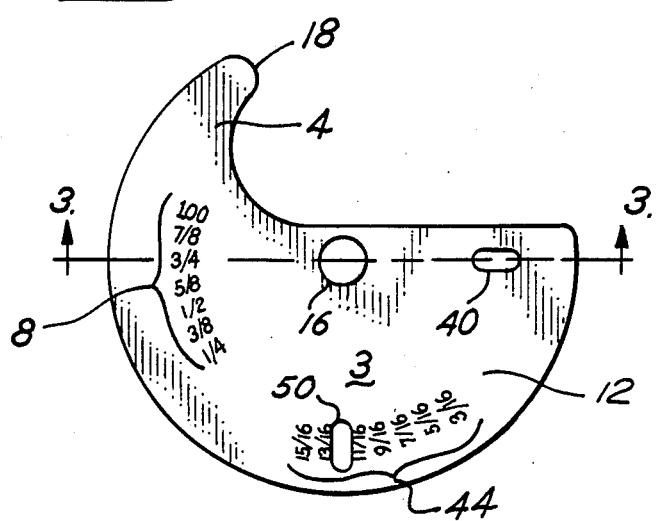
FIG. 2 is a plan view of the first component element.
Figure 3:
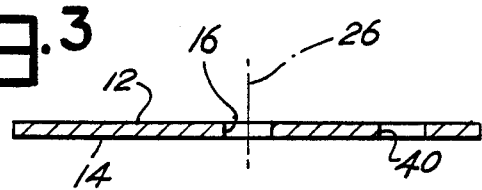
FIG. 3 is a cross-sectional view of the first component element.

With reference to FIGS. 2 and 3, the first component element 1 is a plate-like member having a generally uniform thickness and having a front face 12 and a back face 14. Component element 1 comprises a first semi-round element 3, which includes an opening 16 located generally at the center of the semi-round element's arc of curvature and forming a pivot therefor. First pincer element 4 is integrally formed with said semi-round element 3. At the tip of pincer element 4 is a generally rounded contact point 18.

The arrangement of the sub-elements of said first component element 1 shall be described with reference to the orientation of a clock wherein the clock is segregated into clock segments each equal to a quarter of the clock face, with the first clock segment beginning at the twelve o'clock ("12:00") position extending clockwise therefrom. The first pincer element 4 occupies the fourth clock segment, i.e., the fourth quarter portion of the clock. Counterclockwise therefrom, said first semi-round element 3 occupies the third and second clock segments and extends slightly into the first clock segment.

Figure 4:
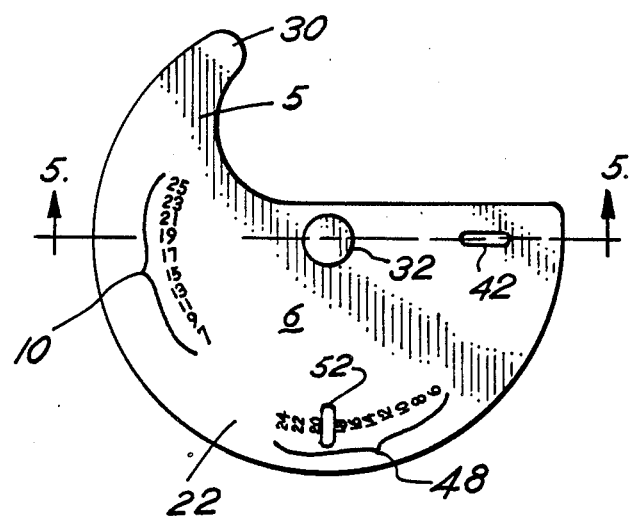
FIG. 4 is a plan view of the second component element in the reverse position from that shown in FIG. 1.
Figure 5:
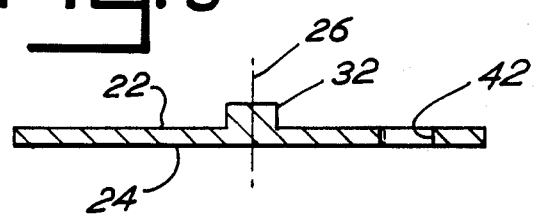
FIG. 5 is a cross-sectional view of the second component element.

With reference to FIGS. 4 and 5, a second component element 2 has a front face 22 and a back face 24.

Component element 2 comprises a second semi-round element 6. Formed integrally with semi-round element 6 is a second pincer element 5. At the tip of pincer element 5 is a generally rounded contact point 30. The component element 2 includes an attachment member 32 thereon. The attachment member 32 is located centrally on the second component element 2 and cooperates with the opening 16 in the first component element 1 to define a pivot axis 26 about which the component elements 1 and 2 rotate. The attachment member 32 extends through the opening 6 in component element 1 and is peened over or otherwise deformed to secure the component elements 1 and 2 to one another. The diameter of opening 16 is approximately the same size as the outer diameter of the attachment member 32. The component element 1 is thus rotatively joined to component element 2 by the cooperation of opening 16 in element 1 and the attachment member 32 on element 2.

The arrangement of the sub-elements of second component element 2 is the same as component element 1. That is, second pincer element 5 occupies the fourth clock segment. Counterclockwise therefrom, the second semi-round element 6 occupies the third and second clock segments and extends slightly into the first clock segment.

Referring now to FIGS. 2 and 4, graduated scale 8 is located towards the perimeter of the first component element 1 and generally spans the third and fourth clock segments. Graduated scale 44 is also located towards the perimeter of the first component element 1 and generally spans the second clock segment. Graduated scale 10 spans the third and fourth clock segments of the second component element 2 and graduated scale 48 spans the second clock segment of element 2. Each graduated scale includes lettering indicating the dimension of each graduation. Further, it is contemplated that the first set of graduated scales 8 and 44 shall be in English measuring units and that the second set of graduated scales 10 and 48 shall be in Metric measuring units.

The purpose of including two graduated scales on each component element 1 and 2 is to increase the number of possible graduations that may be included. The overall size of the device limits the number of possible graduations. Therefore, to increase the number of graduations without increasing the overall size of the device, and as an alternative to reducing the size of the lettering, scales 44 and 48, include additional graduations not shown on scales 8 and 10. Thereby, the number of graduations for each measuring standard is increased for better accuracy, without sacrificing legibility.

In the preferred embodiment, graduated scale 8 includes graduation intervals: ¼ inch, ⅜ inch, ½ inch, ⅝ inch, ¾ inch, ⅞ inch and 1 inch. Graduated scale 50 includes graduation intervals: 5/16 inch, 7/16 inch, 9/16 inch, 11/16 inch, 13/16 inch, and 15/16 inch. Graduated scale 10 includes graduation intervals: 8 millimeters ("mm"), 10 ml, 12 "mm", 14 "mm", 17 "mm", 21 "mm" and 25 "mm". Graduated scale 52 includes graduation intervals: 7 "mm", 9 "mm", 11 "mm", 13 "mm", 15 "mm", 19 "mm" and 23 "mm".

The graduated scales 8, 44 and 10, 48 may be applied directly onto the surfaces of the front faces 12 and 22, respectively, of component elements 1 and 2. For example, the scales may be in the form of decals or, as is preferred, the scales 8, 44 and 10, 48 may be engraved or impressed into the surfaces of the front faces 12 and 22, respectively, of component elements 1 and 2.

Associated with each graduated scale is a corresponding means for indicating the selected graduation on the scale, 40, 50, 42, and 52. In the preferred embodiment, an oblong shaped indicating window is used, the size of which is equivalent to the size of the lettering of a single graduation. The indicating windows 40 and 42 of both first and second component elements 1 and 2 are generally located in the area defining the boundary between the first and second clock segments of the compound elements. The indicating windows 50 and 52 are generally located in the area defining the boundary between the second and third clock segments of the component elements. Thereby, the indicating windows 42 and 52, respectively, of component element 2 cooperate with the English unit scales 8 and 44, respectively, of component element 1 and conversely, the indicating windows 40 and 50, respectively, of the first component element 1 cooperate with the Metric unit scales 10 and 48, respectively, of component element 2.

Referring to FIGS. 1–5, the device is constructed by placing the scaled front face 12 of component element 1 underneath the scaled front face 22 of the second component element 2 such that, pincer elements 4 and 5 oppose each other. Elements 1 and 2 are pivotally attached at the pivot axis 26 and are retained in assembled relationship by the attaching member 32. In the assembled position, the front faces 12 and 22 are in·close proximity to one another to increase the overall accuracy of the device. Another feature of the device is that the back faces 14 and 24 serve as protective barriers for the graduated scales 8, 44, 10, and 48, protecting the graduated scales from unnecessary wear and exposure.

The boundaries of the gap G are defined by the contact points 18 and 30 of the first and second pincer elements 4 and 5. An object is measured by rotating the component elements about the pivot axis 26 to adjust the size of gap G until the contact points are aligned with the object being measured. As the elements rotate, so do the associated indicating windows 40, 50 and 42, 52. The rotation of each indicating window 40, 50 and 42, 52, respectively, is operatively associated with the corresponding graduated scale 10, 48 and 8, 44, respectively. When the relative distance between the contact points is either increased or decreased, the indicating windows 40, 50, 42, and 52 rotate to correspond to the selected graduation on the associated scale 10, 48, 8, and 44 representing the actual dimension between the contact points. For example, when the relative distance between the contact points is equivalent to one ("1") inch, indicating window 42 rotates a distance so that the one ("1") inch graduation on scale 8 is visible through the opening of indicating window 42.

The device so described permits the user to gauge the size of a bolt regardless of whether the bolt is a Metric or an English standard bolt. It may also be used to obtain a rough approximation of an equivalent bolt size across the measuring standards. For example, the device may be used to approximate the Metric equivalent of an English bolt size and conversely, the English equivalent of a Metric bolt size.

While there has been set forth a preferred embodiment of the invention, it should be understood that the description is not intended to limit the scope of the invention and that the invention is to be limited only by the true spirit and scope of the following claims.

What I claim is:

1. A measuring device comprising:

(a) a first semi-round plate element having at least one contact point;

(b) a second semi-round plate element having at least one contact point, the outer configuration and the size of each plate element being substantially the same;

(c) means for pivotally connecting said first plate element to said second plate element wherein the contact points for said first and second plate elements oppose each other to define adjustable reference points for measurement;

(d) at least one graduated scale on said first plate element operatively associated with the contact points of the first and second plate elements;

(e) at least one graduated scale on said second plate element operatively associated with the contact points of the first and second plate elements;

(f) means on the second plate element for indicating a selected graduation on said first plate element scale and the associated indicating means cooperate to define the relative dimension between the contact points; and (g) means on the first plate element for indicating a selected graduation on said second plate element scale whereby said second plate element scale and indicating means cooperate to define the relative dimension between the contact points.

2. The measuring device of claim 1 wherein said graduated scale of the first plate element is in English units and said graduated scale of the second plate element is in Metric units.

3. The measuring device of claim 1 wherein the graduated scales of said first and second plate elements are on the front faces of each plate element and are protected by the back faces of each plate element when in assembled relationship.

4. The measuring device of claim 1 wherein said means for indicating is a window.

* * * * *